United States Patent [19]

Mitsuyasu et al.

[11] Patent Number: 4,966,119
[45] Date of Patent: Oct. 30, 1990

[54] FUEL INJECTION CONTROL DEVICE FOR USE IN AN ENGINE

[75] Inventors: Masaki Mitsuyasu; Naoyuki Tsuzuki, both of Susono, Japan

[73] Assignee: Toyota Jidosha Kabushiki Kaisha, Japan

[21] Appl. No.: 295,296

[22] Filed: Jan. 10, 1989

[30] Foreign Application Priority Data

Jan. 12, 1988 [JP] Japan .................................. 63-3049
Jul. 8, 1988 [JP] Japan ................................ 63-168670

[51] Int. Cl.⁵ ............................................. F07M 39/00
[52] U.S. Cl. ................................. 123/498; 123/300; 123/179 L
[58] Field of Search ........... 123/498, 299, 300, 179 L, 123/497

[56] References Cited

U.S. PATENT DOCUMENTS

| | | | |
|---|---|---|---|
| 4,340,024 | 7/1982 | Suzuki et al. | 123/538 |
| 4,508,083 | 4/1985 | Hasegawa | 123/179 L |
| 4,632,311 | 12/1986 | Nakane et al. | 239/101 |
| 4,649,886 | 3/1987 | Igashira | 123/498 |
| 4,688,536 | 8/1987 | Mitsuyasu et al. | 123/490 |
| 4,705,003 | 11/1987 | Sakakibara et al. | 123/449 |
| 4,732,129 | 3/1988 | Takigawa | 123/498 |
| 4,767,959 | 8/1988 | Sakakibara | 123/498 |
| 4,844,039 | 7/1989 | Osaki | 123/480 |

FOREIGN PATENT DOCUMENTS

| | | | |
|---|---|---|---|
| 3621541 | 1/1987 | Fed. Rep. of Germany | 123/498 |
| 59-58129 | 4/1984 | Japan . | |
| 60-237869 | 11/1985 | Japan . | |
| 61-271881 | 2/1986 | Japan . | |
| 0038639 | 2/1988 | Japan | 123/498 |

OTHER PUBLICATIONS

European Patent Office, European Search Report, 01/12/89, pp. 1–3.

*Primary Examiner*—Carl Stuart Miller
*Attorney, Agent, or Firm*—Kenyon & Kenyon

[57] ABSTRACT

A fuel injection control device comprising a fuel injector driven by a piezoelectric element. The piezoelectric element is charged with a electrons by using an LC resonant circuit, and the electrons charged in the piezoelectric element are discharged by using an LC resonant circuit. The piezoelectric element is driven before the regular injection is begun.

26 Claims, 18 Drawing Sheets

FUEL INJECTION CONTROL DEVICE FOR USE IN AN ENGINE

BACKGROUND OF THE INVENTION

1. Field of the Invention

The present invention relates to a fuel injection control device for use in an engine.

2. Description of the Related Art

In a fuel injection control device wherein the injection of fuel is controlled by a piezoelectric element, a drive control circuit is known which initially produces a control pulse for driving the piezoelectric element when the actual fuel injection is to be carried out (Japanese Unexamined Patent Publication 60-237869).

In this case, however, when the control pulse for driving the piezoelectric element is fed thereto, a sufficient number of electrons has not been charged to the piezoelectric element, and thus the piezoelectric element can not expand to a required extent. Consequently, even if the control pulse for driving the piezoelectric element is fed thereto to carry out an injection of fuel when the engine is started, since the piezoelectric element can not properly expand, the injection of fuel is not carried out or, even if the injection of fuel is carried out, only a small amount of the fuel is injected, and accordingly, a problem arises in that it is difficult to start the engine.

SUMMARY OF THE INVENTION

An object of the present invention is to provide a fuel injection control device capable of easily starting the engine.

According to the present invention, there is provided a fuel injection control device of an engine, comprising: a fuel injector having a piezoelectric element controlling an injection of fuel from the fuel injector; a drive unit for charging the piezoelectric element with electrons by using an LC resonant circuit and discharging electrons charged in the piezoelectric element by using an LC resonant circuit, to drive the piezoelectric element; and a control unit for controlling the drive unit to drive the piezoelectronic element at least once before a regular injection by the fuel injector is carried out.

The present invention may be more fully understood from the description of preferred embodiments of the invention set forth below, together with the accompanying drawings.

DESCRIPTION OF THE PREFERRED EMBODIMENTS

FIGS. 1 through 12 show the present invention when applied to a unit injector.

Figure 8:
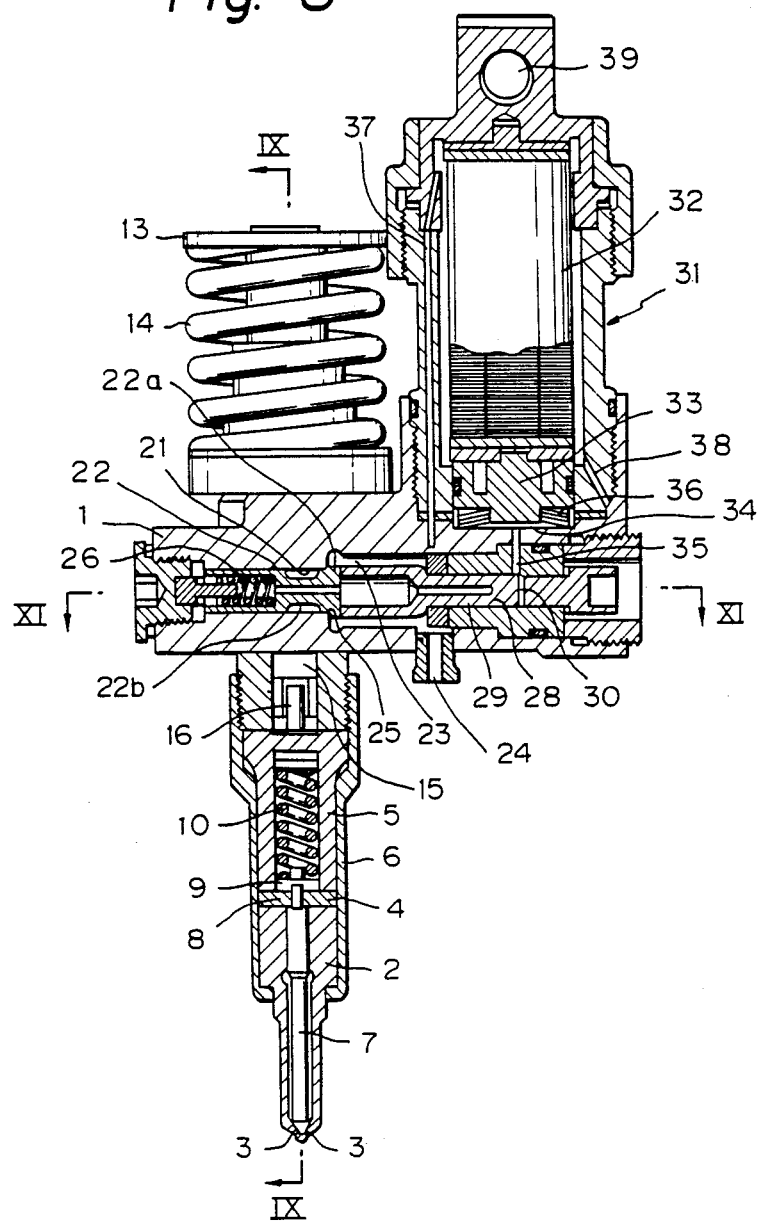
FIG. 8 is a cross-sectional view of the unit injector, taken along the line VIII—VIII in FIG. 9.
Figure 9:
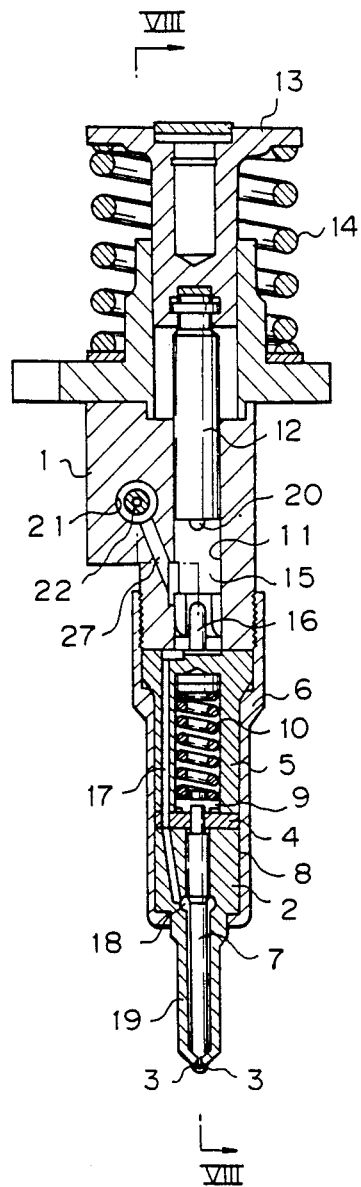
FIG. 9 is a cross-sectional side view of the unit injector, taken along the line IX—IX in FIG. 8.
Figure 10:
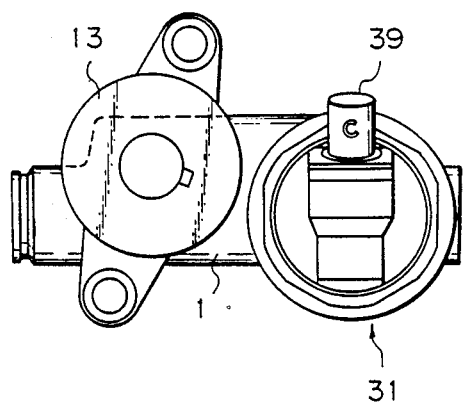
FIG. 10 is a plan view of FIG. 8.

First, an explanation will be made of the structure of the unit injector with reference to FIG. 8 to FIG. 12. As shown in FIG. 8 to FIG. 10, reference numeral 1 indicates the housing body of the unit injector, 2 a nozzle having a nozzle opening 3 at the end portion thereof, 4 a spacer, 5 a sleeve, and 6 a nozzle holder for mounting the nozzle 2, spacer 4, and sleeve 5 to the housing body 1. A needle 7 is slidably inserted in the nozzle 2 and opens and closes the nozzle opening 3. The top of the needle 7 is connected to a spring retainer 9 via a pressure pin 8. The spring retainer 9 is biased downward by a compression spring 10 and this bias force is communicated to the needle 7 through the pressure pin 8. Therefore, the needle 7 is biased to close the valve by the compression spring 10.

Plunger bore 11 is formed in the housing body 1 coaxially with the needle 7, and a plunger 12 is slidably inserted in this plunger bore 11. The top end of the plunger 12 is connected to a tappet 13, which is biased upward by a compression spring 14. This tappet 13 is moved up and down by an engine driven cam and thus the plunger 12 is moved up and down in the plunger bore 11. A high pressure fuel chamber 15 defined by the plunger 12 is formed in the plunger bore 11 under the plunger 12. This high pressure fuel chamber 15 is connected to a pressurized fuel reservoir 18 via a rod filter 16 and a fuel passage 17. The pressurized fuel reservoir 18 is connected to the nozzle opening 3 through an annular fuel passage 19 around the needle 7. Further, a fuel supply port 20 is formed in the wall of the plunger bore 11 and is communicated with the high pressure fuel chamber 15 when the plunger 12 is in the upper position, as shown in FIG. 9. Fuel having a pressure of about 3 kg/cm$^2$ is supplied from the fuel supply port 20 to the high pressure fuel chamber 15.

A bore 21 is formed in the housing body 1 and extends in a plane perpendicular to the plunger bore 11. A spill valve 22 is slidably inserted in the bore 21, and a fuel spill chamber 23 having a diameter larger than that of the bore 21 is formed adjacent to the bore 21. Fuel is fed into the fuel spill chamber 23 from a fuel supply port 24 and flows out from the fuel outlet (not shown). The fuel pressure in the fuel spill chamber 23 is maintained at about 3 kg/cm$^2$. The spill valve 22 is provided with an enlarged head portion 22a which is arranged in the fuel spill chamber 23 and a circumferential groove 22b adjoining the enlarged head portion 22a; the enlarged head portion 22a controlling the opening and closing of a valve port 25. The spill valve 22 is biased to the right in FIG. 8 by a compression spring 26 arranged opposite to the enlarged head portion 22a. Further, a fuel spill passage 27 is formed in the housing body 1 and extends at an angle from the high pressure fuel chamber 15, as shown in FIG. 9. One end of the fuel spill passage 27 is communicated with the high pressure fuel chamber 15, and the other end of the fuel spill passage 27 is communicated with the circumferential groove 22b of the spill valve 22.

Also, a rod bore 28 is formed coaxially with the bore 21 in the housing body 1, and has a rod 29 slidably inserted therein. One end of the rod 29 abuts against the enlarged head portion 22a of the spill valve 22, and the other end of the rod 29 defines a pressure control chamber 30.

A piezoelectric element housing 31, fastened to the housing body 1, comprises a piezoelectric element 32 formed of a plurality of stacked piezoelectric element plates, and constitutes an actuator. A piston 33 is slidably inserted at the bottom end of the piezoelectric element housing 31, and a cylinder chamber 34 filled with fuel is formed under the piston 33. This cylinder chamber 34 is connected to the pressure control chamber 30 through a fuel passage 35 and contains a flat spring 36 which biases the piston 33 upward. The piezoelectric element 32 is supported between the top of the piezoelectric element housing 31 and the piston 33. The piezoelectric element housing 31 includes a cooling liquid supply passage 37 and a cooling liquid discharge passage 38 for supplying a cooling liquid, for example, fuel, around the piezoelectric element 32. The cooling liquid, for example, fuel, is supplied at the top of the piezoelectric element 32 from the cooling liquid supply passage 37, descends around the cools the piezoelectric element 32, and is discharged from the cooling liquid discharge passage 38. A plug 39 is mounted at the top of the piezoelectric element housing 31 for supplying power to the piezoelectric element 32.

Figure 11:
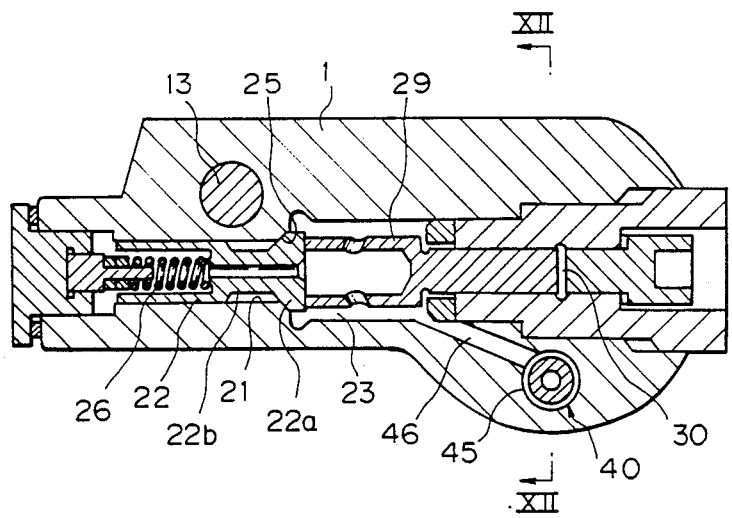
FIG. 11 is a cross-sectional view of the unit injector, taken along the line XI—XI in FIG. 8.
Figure 12:
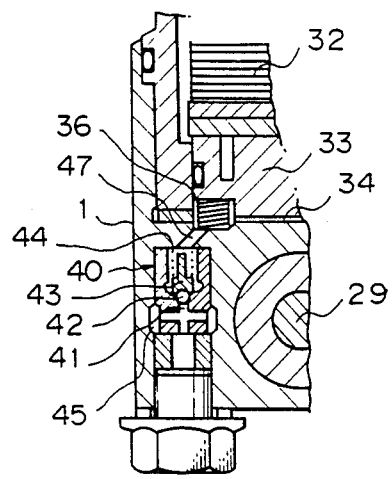
FIG. 12 is a cross-sectional view of a portion of the unit injector, taken along the line XII—XII in FIG. 11.

As shown in FIG. 11 and FIG. 12, a check valve 40 is inserted in the housing body 1. This check valve 40 is provided with a ball 42 for opening and closing a valve port 41, a rod 43 for restricting the amount of lift of the ball 42, and a compression spring 44 for biasing the ball 42 and rod 43 downward, and therefore, the valve port 41 is normally closed by the ball 42. The valve port 41 of the check valve 40 is communicated with the fuel spill chamber 23 through an annular fuel inflow passage 45 and fuel inflow passage 46, and a fuel outflow passage 47 of the check valve 40 is connected to the cylinder chamber 34. As mentioned earlier, the fuel pressure in the fuel spill chamber 23 is maintained at about 3 kg/cm$^2$, and when the fuel pressure in the cylinder chamber 34 becomes lower than the fuel pressure in the fuel spill chamber 23, the check valve 40 is opened and additional fuel is supplied to the cylinder chamber 34, and therefore, the cylinder chamber 34 is always filled with fuel.

As mentioned earlier, when the plunger 12 is at the upper position, fuel is supplied to the high pressure fuel chamber 15 from the fuel supply port 20, and therefore, the pressure in the high pressure fuel chamber 15 is about 3 kg/cm$^2$. At this time the piezoelectric element 32 is fully contracted, and thus the fuel pressure in the cylinder chamber 34 and the pressure control chamber 30 is about 3 kg/cm$^2$. Therefore, the spill valve 22 is moved to the right in FIG. 8 by the compression spring 26 and the enlarged head portion 22a of the spill valve 22 opens the valve port 25. Accordingly, the fuel pressure in the fuel spill passage 27 and the circumferential groove 22b of the spill valve 22 is also about 3 kg/cm$^2$.

When the plunger 12 is moved downward, the fuel supply port 20 is closed by the plunger 12 but the spill valve 22 opens the valve port 25, so that fuel in the high pressure fuel chamber 15 flows out through the fuel spill passage 27, the circumferential groove 22b of the spill valve 22, and the valve port 25 to the fuel spill chamber 23. Therefore, the fuel pressure in the high pressure fuel chamber 15 remains about 3 kg/cm$^2$.

When a charge is given to the piezoelectric element 32 to start the fuel injection, the piezoelectric element 32 expands axially, and as a result, the piston 33 is moved downward, and thus the fuel pressure in the cylinder chamber 34 and the pressure control chamber 30 is rapidly increased. When the fuel pressure in the pressure control chamber 30 is increased, the rod 29 is moved to the left in FIG. 8, and therefore, the spill valve 22 is also moved to the left and the enlarged head portion 22a of the spill valve 2 closes the valve port 25. When the valve port 25 is closed, the fuel pressure in the high pressure fuel chamber 15 is rapidly increased due to the downward movement of the plunger 12, and when the fuel pressure in the high pressure fuel chamber 15 exceeds a predetermined pressure, for example, 1500 kg/cm$^2$ or more, the needle 7 is opened and fuel is injected from the nozzle opening 3. At this time, a high pressure is also applied to the inside of the circumferential groove 22b of the spill valve 22 through the fuel spill passage 27, but the pressure receiving areas of the two axial end surfaces of the circumferential groove 22b are equal, and thus a drive force does not act on the spill valve 22.

When the charge of the piezoelectric element 32 is discharged to stop the fuel injection, the piezoelectric element 32 contracts, and as a result, the piston 33 is moved upward by the flat spring 36, and therefore, the fuel pressure in the cylinder chamber 34 and the pressure control chamber 30 is reduced, and thus the rod 29 and the spill valve 22 are moved to the right in FIG. 8 by the compression spring 26 and the enlarged head portion 22a of the spill valve 22 moved to open the valve port 25. As a result, the high pressure fuel in the high pressure fuel chamber 15 flows through the fuel spill passage 27, the circumferential groove 22b of the spill valve 22, and the valve port 25 to the fuel spill chamber 23, and accordingly, the fuel pressure inside the high pressure fuel chamber 15 immediately drops to a low pressure of about 3.0 kg/cm$^2$, the needle 7 is moved downward, and the fuel injection is stopped. The plunger 12 is then moved upward to the upper position thereof and then again begins to move downward.

Next, the drive control method of the piezoelectric element 32 will be described with reference to FIGS. 1 through 7.

Figure 1:
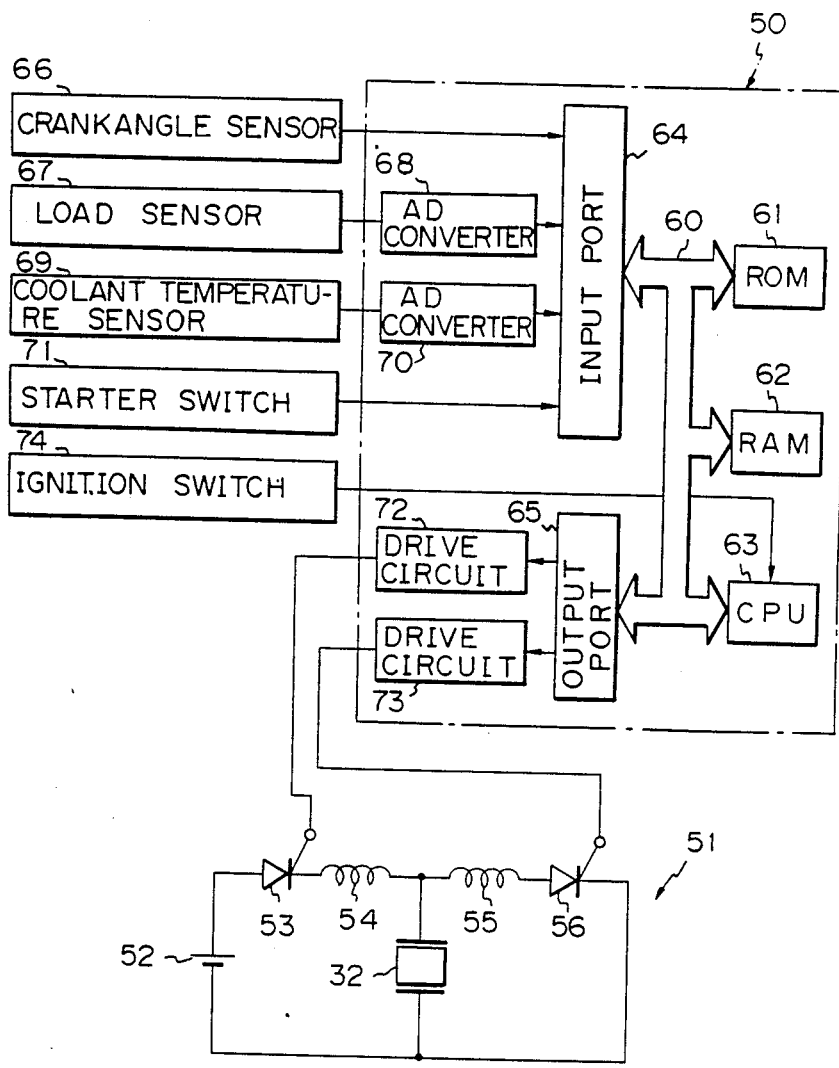
FIG. 1 is a diagram of a circuit for driving the piezoelectric element.

FIG. 1 illustrates a drive control circuit for the piezoelectric element 32.

The drive control circuit illustrated in FIG. 1 comprises an electronic control unit 50 and a drive circuit 51. The drive circuit 51 comprises a power source 52, a thyristor 53, a charging coil 54, a discharging coil 55, and a thyristor 56. One of the terminals of the piezoelectric element 32 is connected to the minus terminal of the power source 52, and the other terminal of the piezoelectric element 32 is connected, on one hand, to the plus terminal of the power source 52 via the charging coil 54 and the thyristor 53, and on the other hand, to the minus terminal of the power source 52 via the discharging coil 55 and the thyristor 56.

The electronic control unit 50 is constructed as a digital computer and comprises a ROM (read only memory) 61, a RAM (random access memory) 62, a CPU (microprocessor, etc.) 63, an input port 64, and an output port 65. The ROM 61, the RAM 62, the CPU 63, the input port 64, and the output port 65 are interconnected via a bidirectional bus 60. Output pulses of a crankangle sensor 66 are input to the input port 64, and an output signal of a load sensor 67, which represents the depression of the accelerator pedal, is input to the input port 64 via an AD converter 68. In addition, an output signal of a coolant temperature sensor 69, which represents the cooling water temperature of the engine, is input to the input port 64 via an AD converter 70, and a starter switch 71 is connected to the input port 64, the output port 65 is connected to the gate terminals of the thyristors 53, 56 via corresponding drive circuits 72, 73. In addition, the electronic control unit 50 is connected to an ignition switch 74, and when the ignition switch 74 is made ON, electric power is supplied to the electronic control unit 50.

Figure 2:
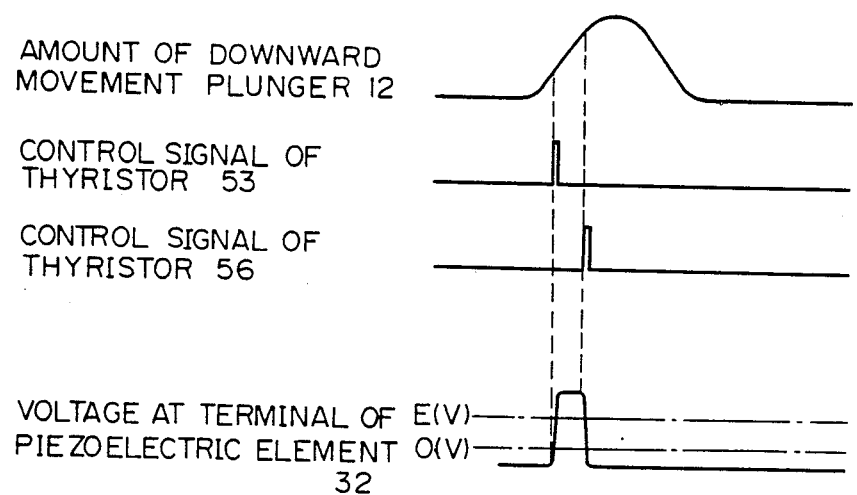
FIG. 2 is a time chart of the drive control of the piezoelectric element, illustrating the time just after the drive control of the piezoelectric element is begun.

FIG. 2 illustrates a time chart of the drive control of the piezoelectric element 32 at a point when a certain time has elapsed after the drive control of the piezoelectric element 32 is begun.

The control signal of the thyristor 53 is output from the electronic control unit 50 just after the downward movement of the plunger 12 is started, and thus the thyristor 53 is turned ON. When the thyristor 53 is turned ON, electrons are gradually charged in the piezoelectric element 32 from the power source 52 via the thyristor 53 and the charging coil 54, and the voltage at the terminal of the piezoelectric element 32 is accordingly gradually increased. At this time, the voltage at the terminal of the piezoelectric element 32 is made higher than the voltage E of the power source 52, by the LC resonant circuit comprising the charging coil 54 and the piezoelectric element 32 (this piezoelectric element can be considered to be a condenser). Subsequently, when the reverse voltage is applied to the thyristor 53, the thyristor 53 is turned OFF.

Then, when the thyristor 56 is turned ON by the control signal for the thyristor 56, the electrons charged in the piezoelectric element 32 are discharged via the discharging coil 55 and the thyristor 56, and thus the voltage at the terminal of the piezoelectric element 32 is lowered. At this time, the voltage at the terminal of the piezoelectric element 32 is brought to less than zero volt by the LC resonant circuit comprising the discharging coil 55 and the piezoelectric element 32.

The fuel injection is started when the piezoelectric element 32 is charged with electrons, and the fuel injection is stopped when the electrons charged in the piezoelectric element 32 are discharged. Consequently, the fuel injection is started by the generation of the control signal for the thyristor 53, and the fuel injection is stopped by the generation of the control signal for the thyristor 56.

As mentioned above, FIG. 2 illustrates a point when a certain time has elapsed after the drive control of the piezoelectric element 32 is begun. At this time, the piezoelectric element 32 is charged with a required amount of electrons, but immediately after the drive control of the piezoelectric element 32 is begun, the amount of electrons charged in the piezoelectric element 32 is small, and thus the amount of expansion of the piezoelectric element 32 is small. This will be described hereinafter with reference to FIG. 3.

Figure 3:
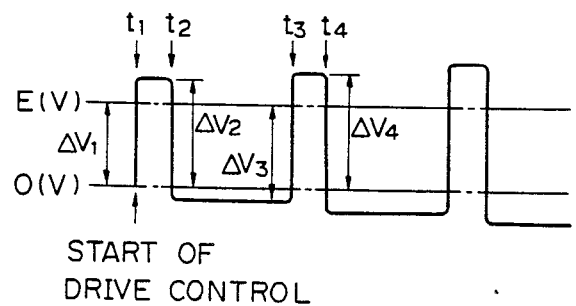
FIG. 3 is a time chart illustrating the voltage at the terminal of the piezoelectric element when the drive control of the piezoelectric element is begun.

FIG. 3 illustrates the voltage at the terminal of the piezoelectric element 32, and as illustrated in FIG. 3, the voltage at the terminal of the piezoelectric element 32 is equal to zero volt before the drive control of the piezoelectric element 32 is begun. Note that the amount of electrons with which the piezoelectric element 32 can be charged is proportional to the difference $\Delta V_1$ between the voltage E of the power source 52 and the voltage at the terminal of the piezoelectric element 32. Consequently, at time $t_1$, the piezoelectric element 32 is charged with an amount of electrons which is proportional to $\Delta V_1$. At this time, the voltage at the terminal of the piezoelectric element 32 is made higher than E (V), by the LC resonant circuit. Similarly, the amount of electrons which can be discharged from the piezoelectric element 32 is proportional to the voltage $\Delta V_2$ at the terminal of the piezoelectric element 32, and consequently, at time $t_2$, an amount of electrons proportional to $\Delta V_2$ is discharged from the piezoelectric element 32. At this time, the voltage at the terminal of the piezoelectric element 32 is brought to less than zero volt by the LC resonant circuit. Then, at time $t_3$, since the piezoelectric element 32 is charged with an amount of electrons proportional to $\Delta V_3$, the amount of electrons charged in the piezoelectric element 32 is increased, and thus the voltage $\Delta V_4$ at the terminal of the piezoelectric element 32 becomes high. Then, at time $t_4$, since an amount of electrons proportional to $\Delta V_4$ is discharged from the piezoelectric element 32, the voltage at the terminal of the piezoelectric element 32 is further lowered. If such a charging operation and a discharging operation are repeated, the amount of charge and the amount of discharge are gradually increased and finally become equal to a fixed amount. FIG. 2 illustrates the state wherein the amount of charge and the amount of discharge are equal to the above fixed amount.

Consequently, when the drive control of the piezoelectric element 32 is begun, since the amount of electrons charged in the piezoelectric element 32 is small, the amount of expansion of the piezoelectric element 32 is small, and thus it is impossible to carry out the fuel injection. Consequently, even if the piezoelectric element 32 is driven t begin the fuel injection when the engine is started, the fuel injection is not carried out, and the drive of the piezoelectric element 32 must be repeated several times, until the piezoelectronic element 32 charged with a sufficient amount of electrons, before the fuel injection can be started, and therefore, a problem arises in that it is difficult to easily start the engine.

In the present invention, to obtain an easy start of the engine, the piezoelectric element 32 is driven before the regular fuel injection is carried out, so that the piezoelectric element 32 is charged with a sufficient amount of electrons when the regular fuel injection is to be carried out.

Next, the drive control method for the piezoelectric element 32 will be described with reference to FIG. 4.

Figure 4:
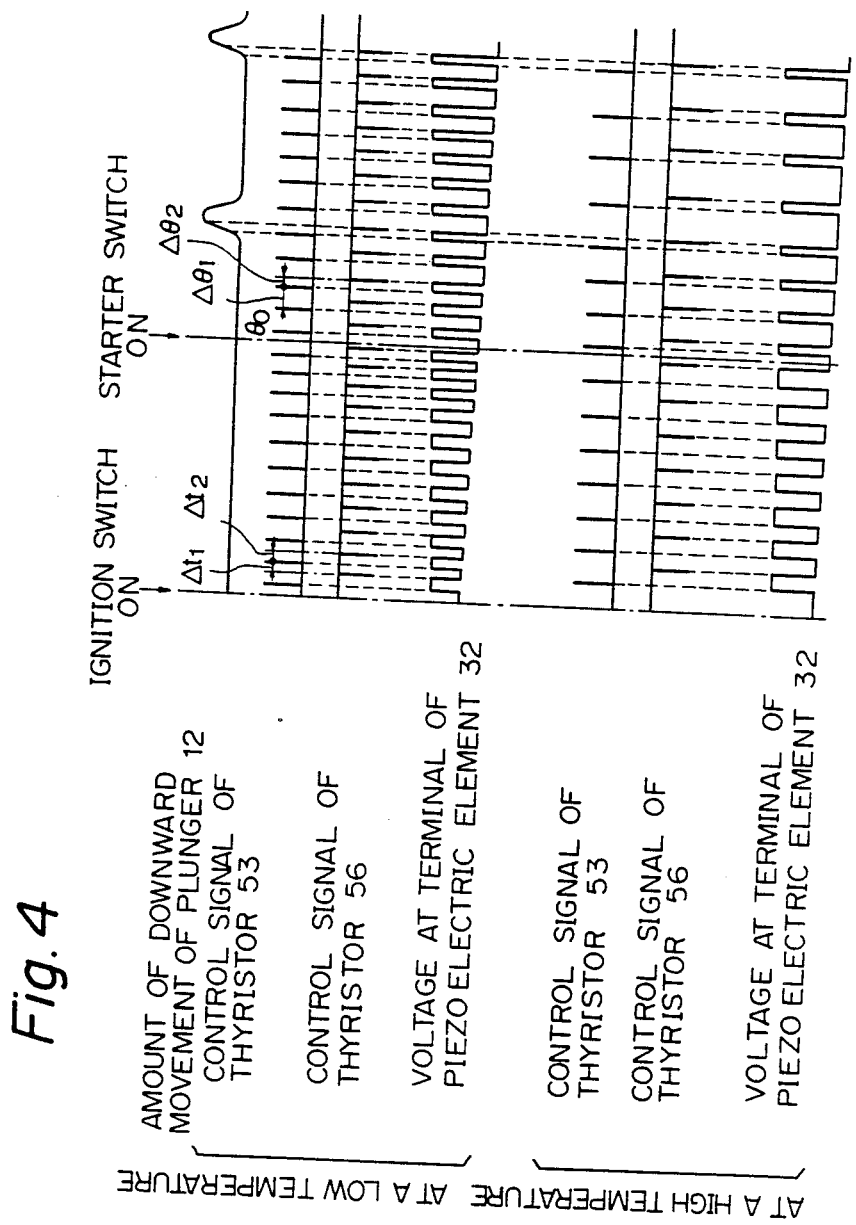
FIG. 4 is a time chart of the drive control of the piezoelectric element.

FIG. 4 illustrates the drive control method at a low temperature and the drive control method at a high temperature. The description will initially encompass the drive control method at a low temperature.

Referring to FIG. 4, when the temperature of the engine is low, during the period from when the ignition switch 74 is made ON to when the starter switch 75 is made ON, the control signal of the thyristor 53 is produced when a time $\Delta t_1$ has elapsed after the control signal of the thyristor 56 is produced, and the control signal of the thyristor 56 is produced when a time $\Delta t_2$ has elapsed after the control signal of the thyristor 53 is produced. At this time, the period ($\Delta t_1 + \Delta t_2$) for driving the piezoelectric element 32 is made much shorter than the period for driving the piezoelectric element 32 when the regular fuel injection is begun after the engine is started. Consequently, during this time, the amount of electrons charged to the piezoelectronic element 32 and the amount of electrons discharged therefrom are gradually increased.

When the starter switch 71 is made ON, the control signal of the thyristor 53 is produced at each rotation of the crankshaft of the engine by a predetermined crankangle $\Delta \theta_1$, and the control signal of the thyristor 56 is produced at each rotation of the crankshaft by a predetermined crankangle $\Delta \theta_2$ after the control signal of the thyristor 53 is produced. The period $\Delta \theta_1$ for driving the piezoelectric element 32 is made smaller than the crankangle for driving the piezoelectric element 32 when the regular fuel injection is begun when the engine is started. Further, the crankangle $\theta_0$ at which the initial control signal of the thyristor 53 is produced is such that, at a later stage, the control signal of the thyristor 53 is produced when the plunger 12 moves downward, and thus an injection of fuel is possible. Furthermore, $\Delta \theta_2$ is such that, when the regular injection is begun, the amount of fuel becomes equal to the amount of fuel necessary to start the engine. Consequently, the amount of electrons charged to the piezoelectric element 32 and the amount of electrons discharged therefrom are also increased after the starter switch 71 is made ON. Subsequently, when the plunger 12 moves downward, and thus a fuel injection is possible, if the piezoelectric element 32 is charged with sufficient electrons, the fuel injection is carried out.

The crystal structure of the piezoelectric element 32 is changed in accordance with a change in temperature, and in general, where the same voltage is applied to the piezoelectric element 32, the amount of electrons charged to the piezoelectric element 32 is increased as the temperature of the piezoelectric element 32 becomes higher. Consequently, when the temperature of the piezoelectric element 32 is high, the amount of electrons charged to the piezoelectric element 32 and the amount of electrons discharged therefrom are sufficiently increased even when the number of repeated generations of the control pulse of the thyristor 53 is small. Consequently, when the engine temperature is high, as illustrated in FIG. 4, the period of generation of the control pulse of the thyristor 53 is large. But the control signal of the thyristor 53 still is produced when the plunger 12 moves downward after the starter switch 74 is made ON.

Figure 5:
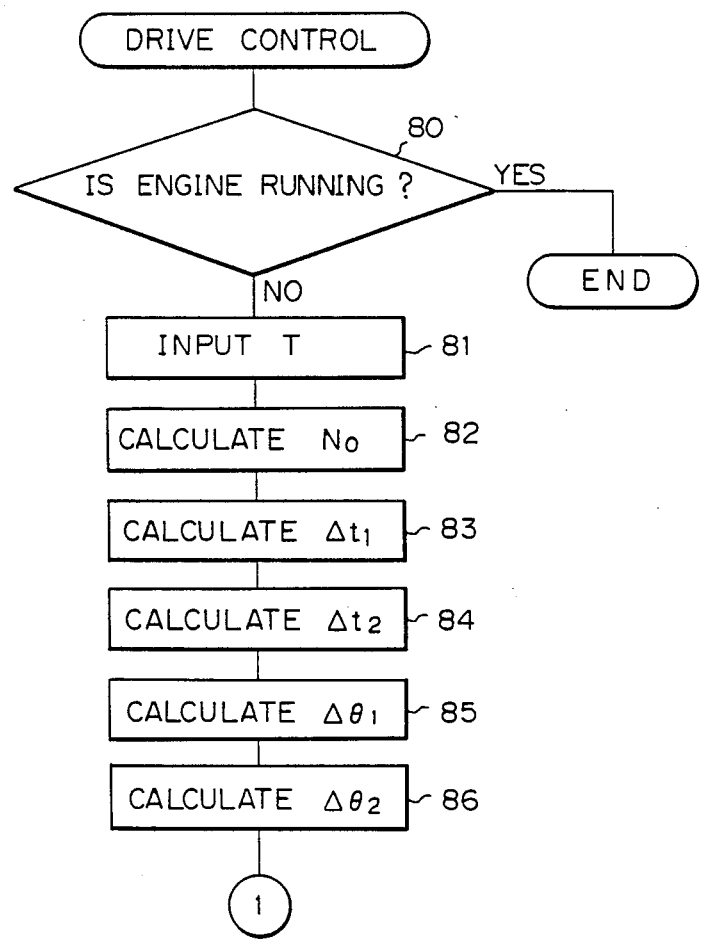
FIGS. 5 and 6 are a flow chart for executing the drive control of the piezoelectric element.
Figure 6:
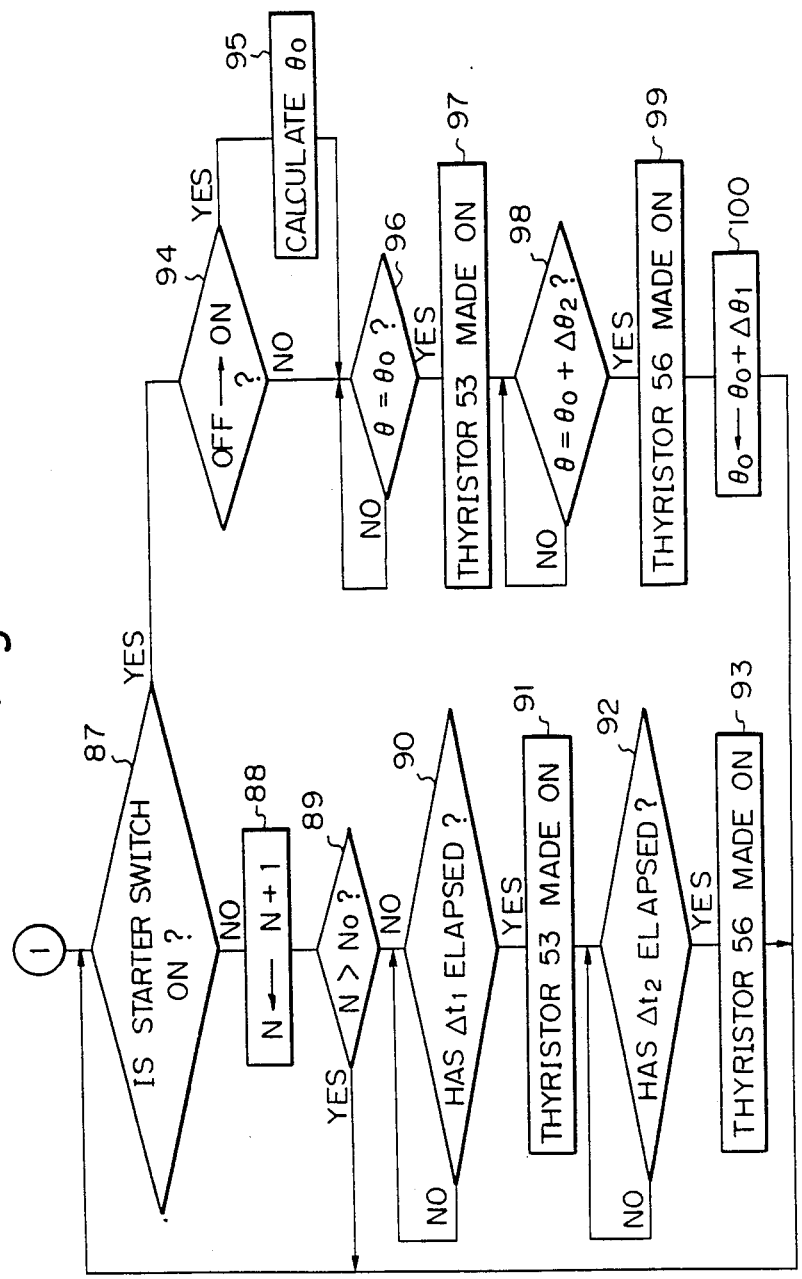
Figure 7:
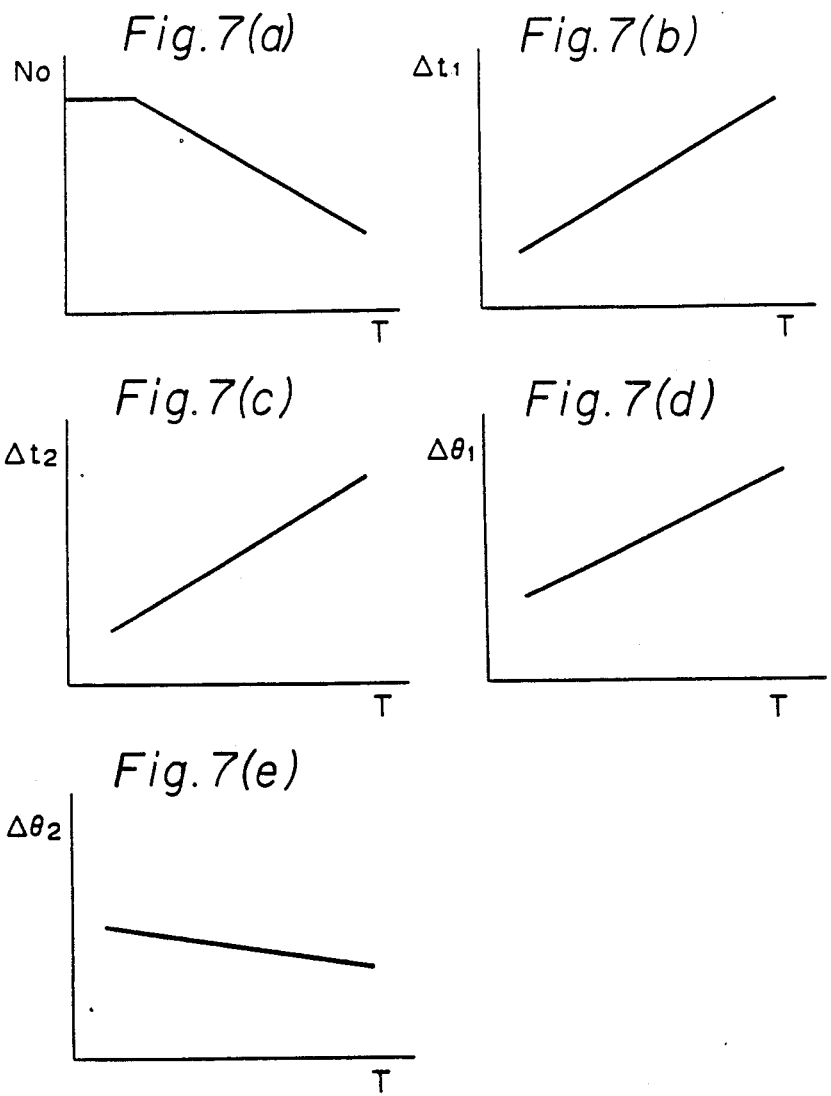
FIGS. 7(a)–(e) are diagrams illustrating the relationship between the cooling water temperature and the maximum number of the repeated drives of the piezoelectric element, etc.

FIGS. 5 and 6 illustrate a routine for carrying out the drive control method shown in FIG. 4. This routine is executed immediately the ignition switch 74 is made ON.

Referring to FIG. 5, in step 80, it is determined whether or not the engine is running. When the engine is running, the process cycle is completed, but when the engine has not been started, the routine goes to step 81. In step 81, the output signal of the coolant temperature sensor 69, which represents the temperature of the engine cooling water T, is input to the CPU 63. Then, in step 82, the maximum number No of the repeated generations of the control signal of the thyristor 53, which control signal is generated before the starter switch 71 is made ON, is calculated. This is a fail safe factor used when the ignition switch 74 is ON but the engine is not started. This maximum number No becomes smaller as the cooling water temperature T is increased, as illustrated in FIG. 7(a). Then, in step 83, $\Delta t_1$ shown in FIG. 4 is calculated. This $\Delta t_1$ becomes larger as the cooling water temperature T is increased, as illustrated in FIG. 7(b). Then, in step 84, $\Delta t_2$ shown in FIG. 4 is calculated. This $\Delta t_2$ becomes larger as the cooling water temperature T is increased, as illustrated in FIG. 7(c). Then, in step 85, $\Delta \theta_1$ shown in FIG. 4 in calculated. This $\Delta \theta_1$ becomes larger as the cooling water temperature T is increased, as illustrated in FIG. 7(d). Then, in step 86, $\Delta \theta_2$ shown in FIG. 4 is calculated. This $\Delta \theta_2$ becomes smaller as the cooling water temperature T is increased, as illustrated in FIG. 7(e). In step 87, it is determined whether or not the starter switch 71 is ON. When the starter switch 71 is not ON, the routine goes to step 88, and the count value N is incremented by one. Then, in step 90, it is determined whether or not the count value N is larger than the maximum value No. If N ≦ No, the routine goes to step 90, and it is determined whether or not $\Delta t_1$ has elapsed When $\Delta t_1$ has elapsed, the routine goes to step 91, and the thyristor 53 is made ON. The routine then goes to step 92, and it is determined whether or not $\Delta t_2$ has elapsed. When $\Delta t_2$ has elapsed, the routine goes to step 93, and thyristor 56 is made ON, and the routine returns to step 87. In step 89, if N > No, the drive control of the thyristors 53 and 56 is stopped.

When the starter switch 71 is made ON, the routine goes to step 94, and it is determined whether or not the starter switch 71 is turned ON. If the starter switch 71 is turned ON, the routine goes to step 95, and $\theta_0$ shown in FIG. 4 is calculated. That is, the crankangle $\theta_0$ at which the control signal of the thyristor 53 is to be initially produced is calculated on the basis of $\Delta \theta_1$ so that the control signal of the thyristor 53 can be produced when the plunger 12 is moving downward. Then in step 96, the process waits until the actual crankangle $\theta$ detected by the crankangle sensor 66 becomes equal to $\theta_0$. When the actual crankangle $\theta$ becomes equal to $\theta_0$, the routine goes to step 97, and the thyristor 53 is made ON. Then, in step 98, the process waits until the actual crankangle $\theta$ becomes equal to ($\theta_0 + \theta_2$). When the actual crankangle $\theta$ becomes equal to ($\theta_0 + \Delta \theta_2$), the routine goes to step 99, and the thyristor 56 is made ON. Then, in step 100, $\Delta \theta_1$ is added to $\Delta_0$, and the result of the addition is memorized as $\Delta_0$, and the routine returns to step 96 via steps 87 and 94.

FIGS. 13 through 21 show the present invention when applied to a fuel injector to which a high pressure fuel is supplied from a fuel pump provided separately from the fuel injector.

First, an explanation will be made of the structure of the engine, with reference to FIGS. 19 and 20.

Figure 19:
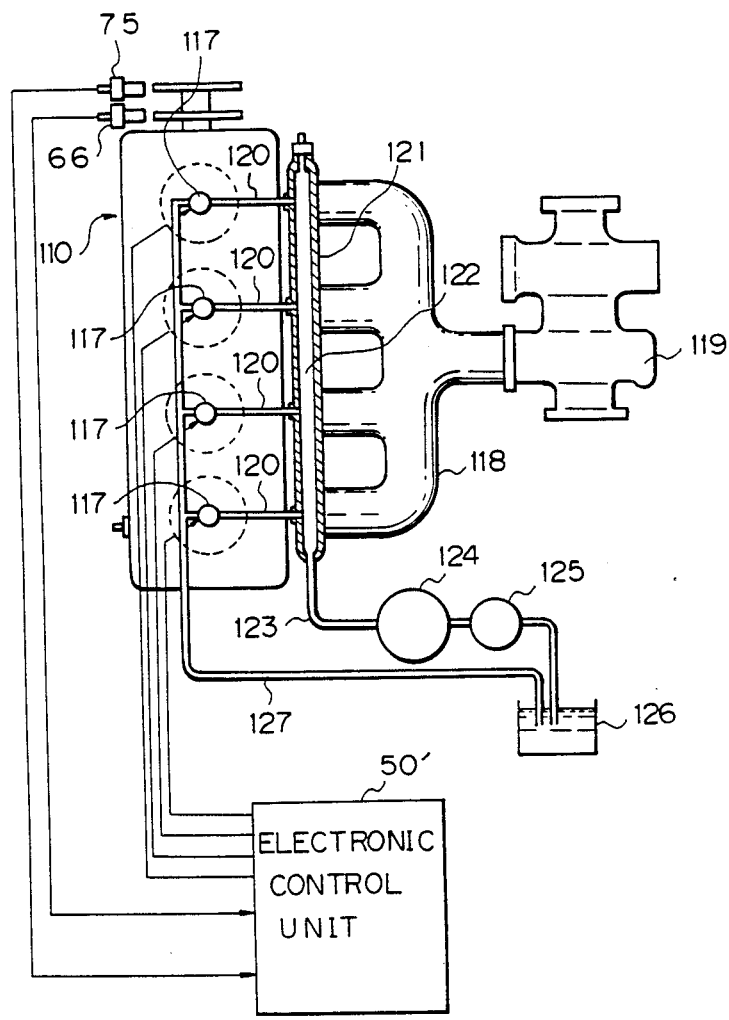
FIG. 19 is a plan view of a diesel engine.
Figure 20:
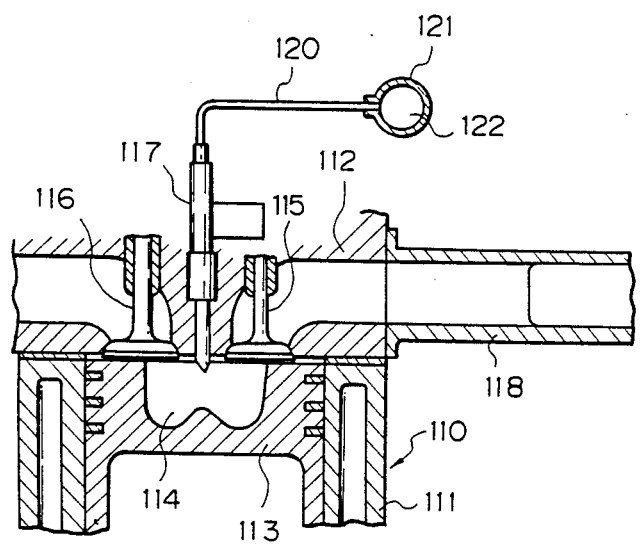
FIG. 20 is a cross-sectional side view of the engine illustrated in FIG. 19.

Referring to FIGS. 19 and 20, reference numeral 110 designates a diesel engine body, 111 a cylinder block, 112 a cylinder head, 113 a piston, 114 a combustion chamber, 115 an intake valve, 116 an exhaust valve, 117 a fuel injector arranged in the combustion chamber 114, and 118 an intake manifold. The air inlet of the intake manifold 118 is connected to a turbocharger 119. A fuel injector 117 is provided for each engine cylinder, and is connected to a common pressurized fuel accumulating tube 121 via corresponding fuel feed conduits 120. Arranged inside the pressurized fuel accumulating tube 121 is a pressurized fuel accumulating chamber 122 having a fixed volume, and pressurized fuel in the pressurized fuel accumulating chamber 122 is fed to the fuel injectors 117 via the corresponding fuel feed conduits 120. The pressurized fuel accumulating chamber 122 is connected, via a fuel feed conduit 123, to the discharge port of a fuel feed pump 124. The amount of fuel discharged from the fuel feed pump 124 is controllable. The suction port of the fuel feed pump 124 is connected to the discharge port of a fuel pump 125, and the suction port of the fuel pump 125 is connected to a fuel reservoir tank 126. In addition, the fuel injectors 117 are connected to the fuel reservoir tank 126 via fuel return conduit 127. The fuel pump 125 is provided for forcing fuel in the reservoir tank 126 into the fuel feed pump 124. Note, where the fuel feed pump 124 can draw in fuel from the fuel reservoir tank 126 under its own power, and thus does not need to use the fuel pump 125 for that purpose, the fuel pump 125 ca be omitted from between the fuel feed pump 124 and the fuel reservoir tank 126. The fuel feed pump 124 is provided for discharging fuel having a high pressure, and the highly pressurized fuel discharged from the fuel feed pump 124 is stored in the pressurized fuel accumulating chamber 122.

Figure 21:
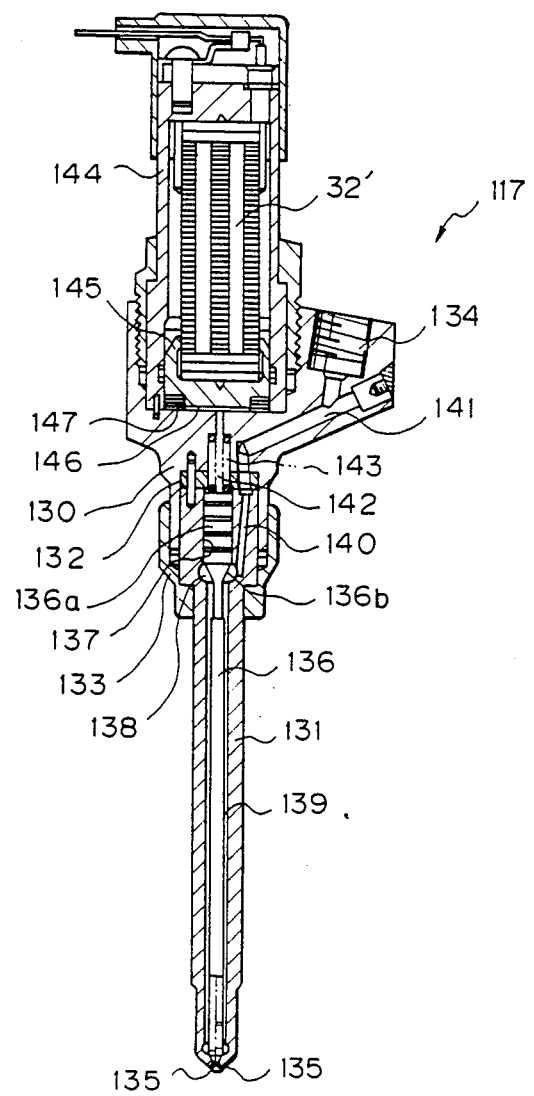
FIG. 21 is a cross-sectional side view of the fuel injector.

FIG. 21 illustrates a cross-sectional side view of the fuel injector 117. Referring to FIG. 21, reference numeral 130 designates an injector body, 131 a nozzle, 132 a spacer, 133 a nozzle holder for fixing the nozzle 131 and the spacer 132 in the injector body 130, 134 a fuel inlet, and 135 nozzle openings formed on the tip of the nozzle 131. A needle 136 is slidably inserted into a needle bore 137 formed in the nozzle 131 to open and close the nozzle openings 135. The needle 136 has an enlarged head portion 136a, and a substantially conical shaped pressure receiving face 136b is formed at the lower end of the enlarged head portion 136a. A needle pressure chamber 138 is formed around the pressure receiving face 136b of the needle 136. This needle pressure chamber 138 is connected, on one hand, to the needle openings 135 via an annular fuel retaining chamber 139 formed around the needle 136, and on the other hand, to the fuel inlet 134 via a fuel passage 140 formed in the nozzle 131 and via a fuel passage 141 formed in the injector body 130. The annular fuel retaining chamber 139 has a cross-sectional area which is larger than that of the fuel passage 140. In addition, preferably the annular fuel retaining chamber 139 has a cross-sectional area ten times as large as the total cross-sectional area of the nozzle openings 135, and that the annular fuel retaining chamber 139 has a volume of more than 0.5 cc.

A pressure control chamber 142 is formed above the enlarged head portion 136a of the needle 136, and a compression spring 143 is arranged in the pressure control chamber 142 to urge the needle 136 downward. An actuator housing 144 is fixed to the injector body 130, and a piston 145 is slidably inserted into the actuator housing 144. A piezoelectric element 32' is inserted between the piston 145 and the top portion of the actuator housing 144. A cylinder chamber 146 is formed below the piston 145 and connected to the pressure control chamber 142, and a plurality of flat springs 147 are arranged in the cylinder chamber 146 to urge the piston 145 upward. A slight clearance exists between the needle bore 137 and the enlarged head portion 136a of the needle 136, and the pressure control chamber 142 is connected to the needle pressure chamber 136b via this slight clearance.

The fuel inlet 134 of the fuel injector 117 is connected to the pressurized fuel accumulating chamber 122 (FIGS. 19 and 20) via the fuel feed conduit 120, and thus the needle pressure chamber 138 and the annular fuel retaining chamber 139 are filled with a high pressure fuel. A part of this high pressure fuel flows into the pressure control chamber 142 via the slight clearance between the needle bore 137 and the enlarged head portion 136a of the needle 136, and thus the pressure control chamber 142 and the cylinder chamber 146 are also filled with the high pressure fuel.

When the piezoelectric element 32' is contracted, the piston 145 moves upward due to the spring force of the flat springs 147, and as a result, since the volume of the cylinder chamber 146 is increased, the pressure of the high pressure fuel in both the cylinder chamber 146 and the pressure control chamber 142 is temporarily reduced. Consequently, the needle 136 is moved upward against the compression spring 143 due to the force acting on the pressure receiving face 136b of the needle 136, and thus the fuel injection is begun.

Since the high pressure fuel in the needle pressure chamber 138 flows gradually into the pressure control chamber 142 while the fuel injection is carried out, the pressure in both the pressure control chamber 142 and the cylinder chamber 146 is gradually increased. When the piezoelectric element 32' is caused to expand, since the piston 145 is moved downward, the pressure in both the cylinder chamber 146 and the pressure control chamber 142 is temporarily increased, and as a result, the needle 136 is moved downward, and thus the injection of fuel is stopped.

Figure 13:
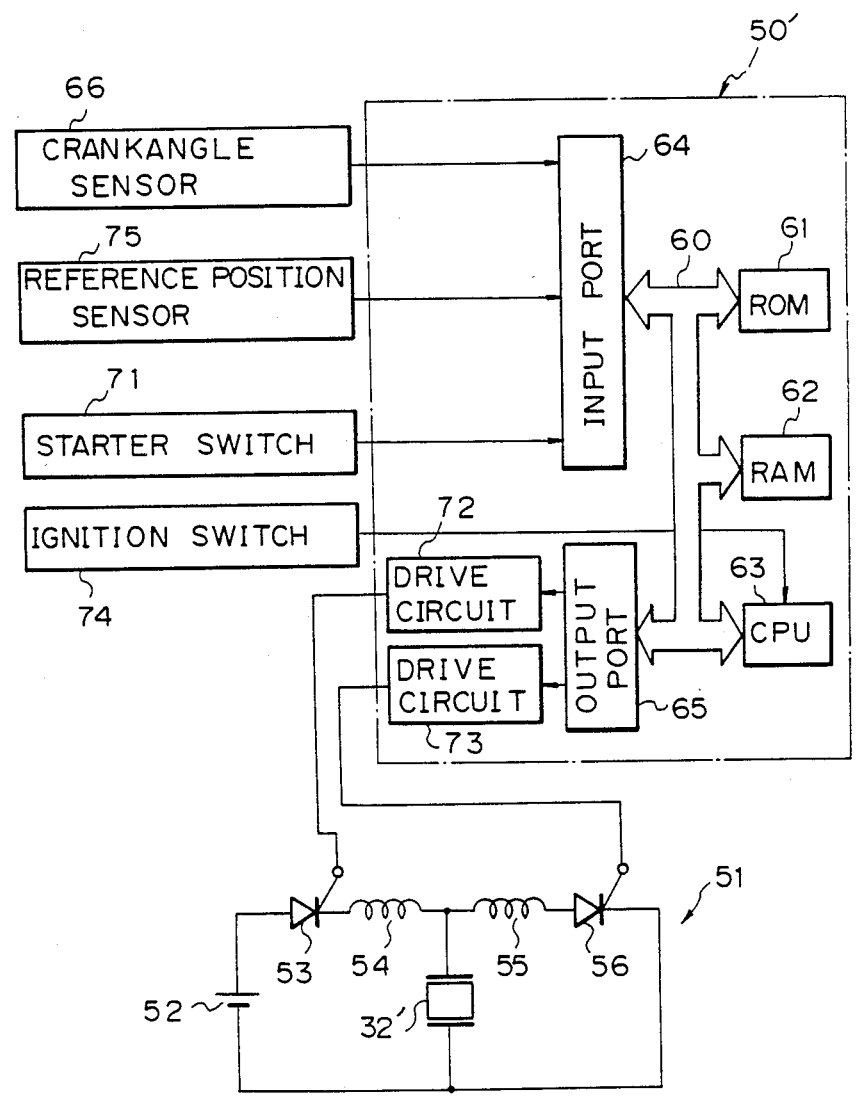
FIG. 13 is a diagram of another circuit for driving the piezoelectric element.

FIG. 13 illustrates a drive control circuit for the piezoelectric element 32'. In this drive control circuit, similar components are indicated with the same reference numerals used in FIG. 1, and a description of similar components is omitted.

The drive control circuit shown in FIG. 13 also comprises the electronic control unit 50' and the drive circuit 51, and a reference position sensor 75 is connected to the input port 64. This reference position sensor 75 produces an output pulse indicating, for example, that No. 1 cylinder is at top dead center in the intake stroke. Consequently, the operation of each fuel injector 117 is determined on the basis of the pulses output by the reference position sensor 75.

Figure 14:
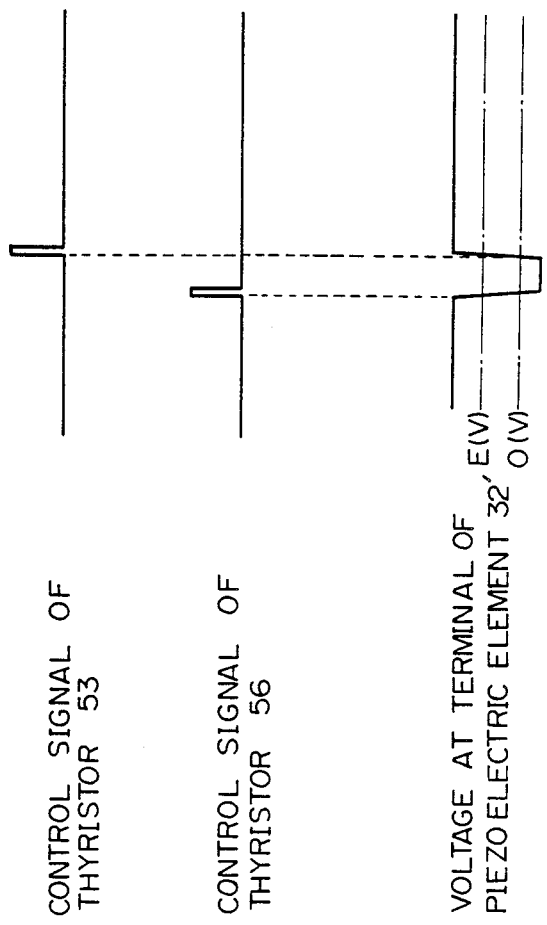
FIG. 14 is a time chart of the drive control of the piezoelectric element, illustrating the time just after the drive control of the piezoelectric element is begun.

FIG. 14 illustrates a time chart of the drive control of the piezoelectric element 32 when a certain time has elapsed after the drive control of the piezoelectric element 32' is begun.

Referring to FIG. 14, when the control signal of the thyristor 56 is produced, the electrons charged in the piezoelectric element 32' are discharged, and thus the piezoelectric element 32' is contracted. At the same time, as mentioned earlier, the fuel injection is begun. Then, when the control signal of the thyristor 53 is produced, the piezoelectric element 32' is charged with electrons and thus is expanded, and at the same time, the fuel injection is stopped.

Also in the embodiment illustrated in FIGS. 19 through 21, when the drive control of the piezoelectric element 32' is begun, since the amount of electrons charged in the piezoelectric element 32' is small, the amount of expansion of the piezoelectric element 32' is small, and thus it is impossible to inject a sufficient amount of fuel from the fuel injector 117, and as a result, a problem arises in that it is difficult to easily start the engine.

In this embodiment, to eliminate the above difficulty, the piezoelectric element 32' is driven at least once before the regular injection of fuel is to be carried out, so that the piezoelectric element 32 is charged with a sufficient amount of electrons when the regular fuel injection is to be carried out.

Next, the drive control method for the piezoelectric element 32' will be described with reference to FIG. 15.

Figure 15:
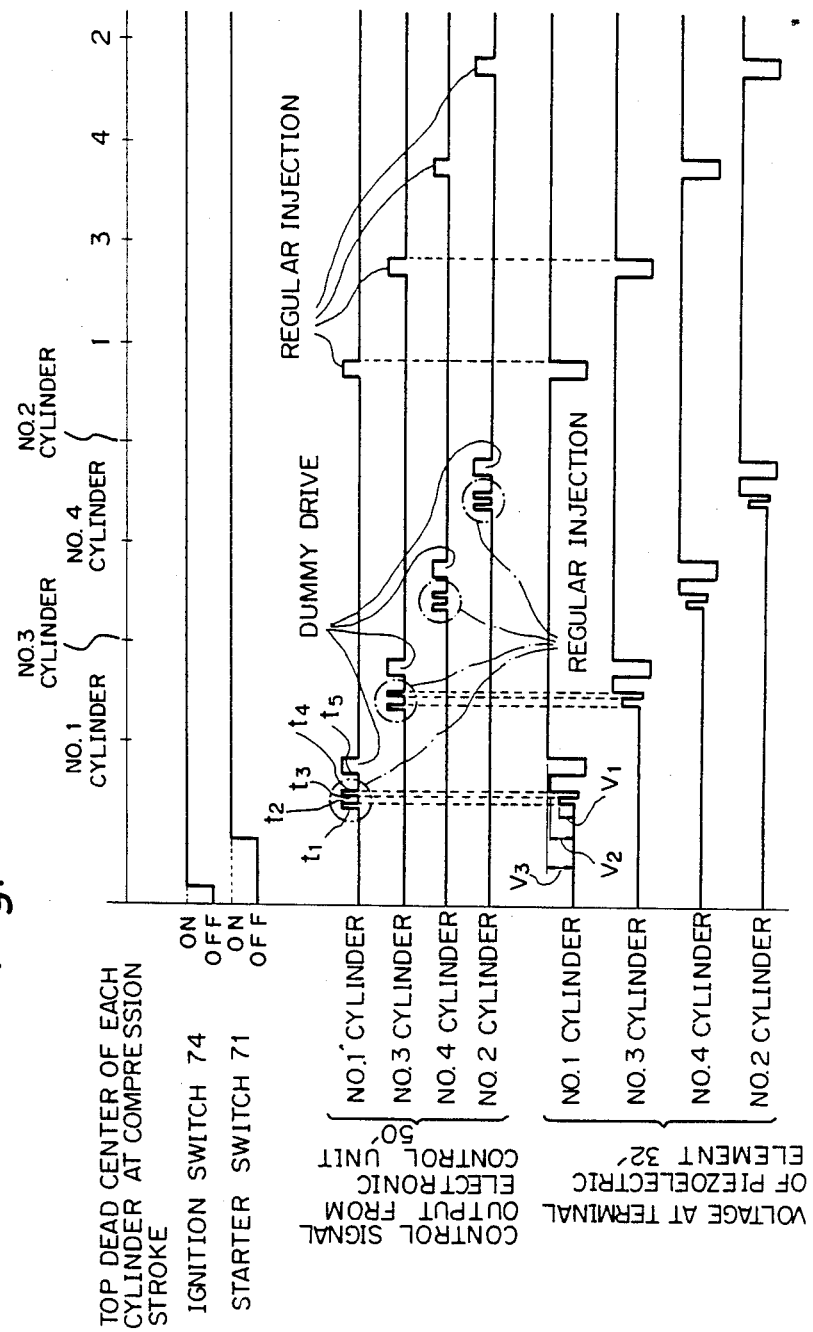
FIG. 15 is a time chart of another embodiment of the drive control of the piezoelectric element.

Referring to FIG. 15, when the engine is to be started, first the ignition switch 74 is made ON and then the starter switch 71 is made ON. After the starter switch 71 is made ON, when it is determined that the stroke of the engine is, for example, the intake stroke or the compression stroke of No. 1 cylinder, the electronic control unit 50' produces two control pulses for driving the thyristors 56 and 53 of No. 1 cylinder. The thyristor 56 is turned ON by the steep increase in the control pulse from the electronic control unit 50', and the thyristor 53 is turned ON by the steep decrease in the control pulse from the electronic control unit 50'. The regular injection of fuel is not carried out by these initial two control pulses from the electronic control unit 50', and thus these initial two control pulses are called dummy pulses hereinafter. The pulse width of the dummy pulse is shorter than the pulse width of the regular fuel injection, and has, for example, a pulse width of 0.1 msec. When the electronic control unit 50' produces the first dummy pulse, the thyristor 56 for the piezoelectric element 32' of No. 1 cylinder is made ON by the steep increase of the first dummy pulse at $t_1$ in FIG. 15. Nevertheless, since the piezoelectric element 32' is not charged with electrons, the voltage at the terminal of the piezoelectric element 32' is maintained at zero volt. Consequently, even if the thyristor 56 is made ON, the fuel injection is not carried out. Then, since the thyristor 53 is turned ON by the steep decrease in the first dummy pulse at $t_2$ in FIG. 15, the piezoelectric element 32' of No. 1 cylinder is charged with electrons, and the voltage at the terminal of the piezoelectric element 32' of No. 1 cylinder becomes equal to $V_1$ in FIG. 15.

When the electronic control unit 32' produces the second dummy pulse, since the thyristor 56 is turned ON by the steep increase in the second dummy pulse, the electrons charged in the piezoelectric element 32' are discharged at $t_3$ in FIG. 15. Although the injection of fuel is carried out, since the injection time is 0.1 msec and thus is very short, and in addition, the piezoelectric element 32' is not charged with sufficient electrons, the amount of fuel injected is very small, but this injected fuel forms a premixture and thus contributes to a good combustion without ignition delay.

Subsequently, since the thyristor 53 is turned ON by the steep decrease in the second dummy pulse at $t_4$ in FIG. 15, the piezoelectric element 32' of No. 1 cylinder is charged with electrons. The voltage at the terminal of the piezoelectric element 32' then becomes equal to $V_2$ (FIG. 15), which is approximately equal to $V_3$ (FIG. 15) reached when the regular fuel injection is carried out. Consequently, the fuel injector 117 of No. 1 cylinder can carry out a regular fuel injection. Therefore, when the electronic control unit 50' produces a control pulse for the regular injection, the regular fuel injection is begun at $t_5$ (FIG. 15) at which the regular fuel injection is to be carried out. Subsequently, the fuel injection is carried out only when the regular fuel injection is to be carried out. As can be seen from FIG. 15, in other cylinders also, the electronic control unit 50, produces two dummy pulses for driving the corresponding piezoelectric elements 32'.

In the embodiment illustrated in FIG. 15, the charging and discharging of the piezoelectric element 32' is carried out prior to the regular injection, and as a result, when the regular fuel injection is to be carried out, since the piezoelectric element 32' is charged with a sufficient amount electrons, and a sufficient amount of the electrons can be discharged therefrom, the predetermined amount of fuel can be injected from the start of the regular fuel injection, and therefore, it is possible to obtain an easy start of the engine. In this embodiment, the electronic control unit 50' produces only two dummy pulses, but it is understood that the electronic control unit 50' can produce three or more dummy pulses if three or more dummy pulses are necessary to charge the piezoelectric element 32' with a sufficient amount of electrons.

Figure 16:
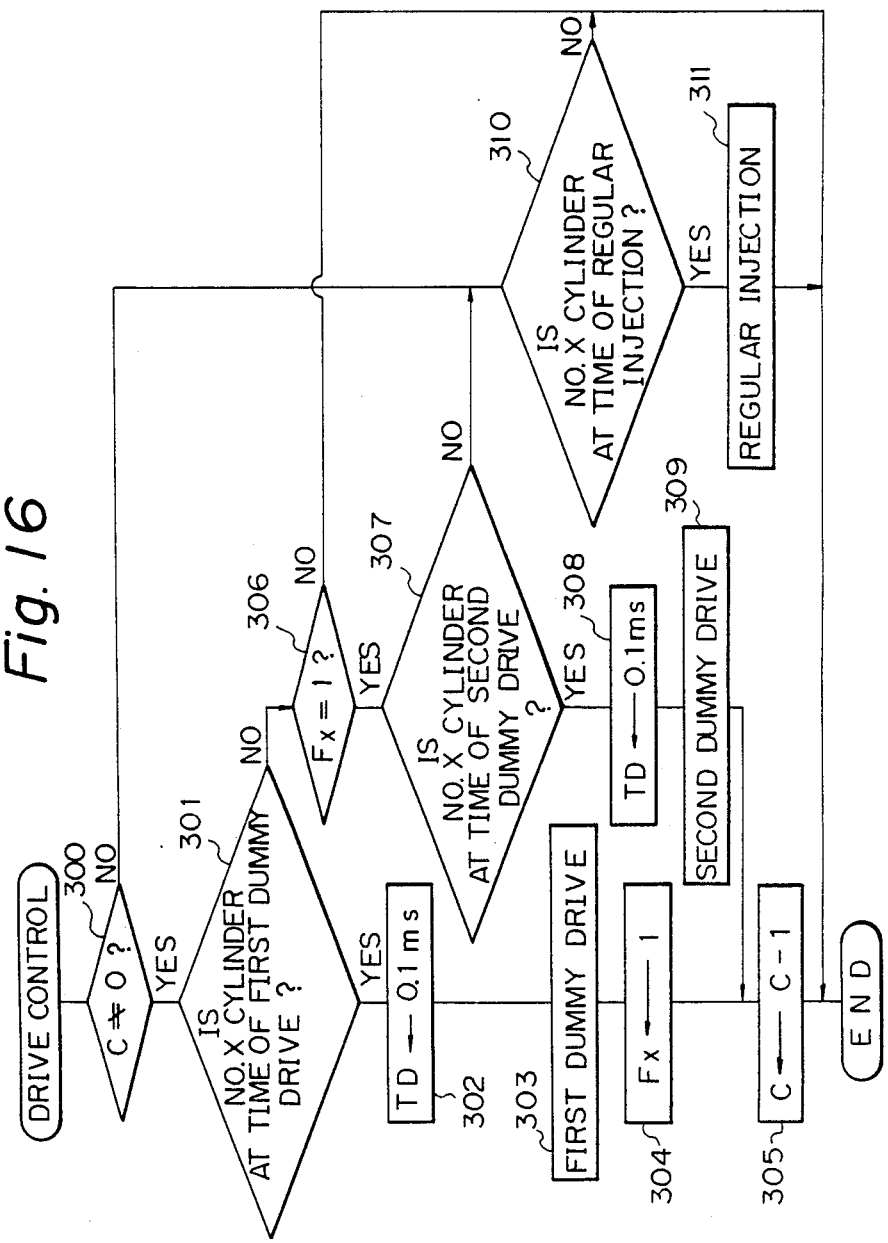
FIG. 16 is a flow chart for executing the drive control illustrated in FIG. 15.

FIG. 16 illustrates a routine for carrying out the drive control method shown in FIG. 15. This routine is processed by sequential interruptions executed at predetermined crankangles. When the ignition switch 74 is made ON, a flag $F_X$ is reset, and the count value of a counter C is set at 8. Then, when the starter switch 71 is made ON, the routine illustrated in FIG. 16 is executed.

Referring to FIG. 16, in step 300, it is determined whether or not the count value of the counter C is equal to zero. When the execution of this routine is started, since the count value of the counter C is set at 8, the routine goes to step 301. In step 301, it is determined whether or not No. X cylinder having a crankangle, for example, between the bottom dead center of the intake stroke and the top dead center of the compression stroke is ready for a start of the first dummy drive. For example, where the crankangle of No. 1 cylinder is, for example, between the bottom dead center of the intake stroke and the top dead center of the compression stroke, in step 301 it is determined whether or not No. 1 cylinder is ready for a start of the first dummy drive. When No. X cylinder is ready for a start of the first dummy drive, the routine goes to step 110, and 0.1 msec is memorized as the length of time TD of the first dummy drive. Then, in step 304, the electronic control unit 50' produces the first dummy pulse of 0.1 msec, and thus the first dummy drive of the piezoelectric element 32' of No. 1 cylinder is carried out for 0.1 msec. Then, in step 304, the flag $F_X$ indicating No. X cylinder is set. Where the first dummy drive of the piezoelectric element 32' of No. 1 cylinder is carried out, the flag $F_1$ is set. Then, in step 305, the count value of the counter C is decremented by one and thus becomes equal to 7.

When it is determined in step 301 that the crankangle of No. X cylinder is not ready for a start of the first dummy drive, the routine goes to step 306, and it is determined whether or not the flag $F_X$, for example, the flag $F_1$, is set. When the flag $F_X$ is not set, the processing cycle is completed. Conversely, when the flag $F_X$ is set, the routine goes to step 307, and it is determined whether or not No. X cylinder is ready for a start of the second dummy drive. That is, when the first dummy drive of the piezoelectric element 32' of No. 1 cylinder has been carried out, in step 307 it is determined whether or not No. 1 cylinder is ready for a start of the second dummy drive. When No. 1 cylinder is ready for a start of the second dummy drive, the routine goes to step 308, and 0.1 msec is memorized as the length of time TD of the second dummy drive. Then, in step 309, the electronic control unit 50, produces the second dummy pulse of 0.1 msec, and thus the second dummy drive of the piezoelectric element 32' is carried out for 0.1 msec. Then, in step 305, the count value of the counter C is further decremented by one and thus becomes equal to 6.

When it is determined in step 307 that No. X cylinder is not ready for a start of the second dummy drive, the routine goes to step 310, and it is determined whether or not No. X cylinder is ready for a start of the regular injection. For example, when both the first dummy drive and the second dummy drive of the piezoelectric element 32' of No. 1 cylinder have been carried out, in step 310 it is determined whether or not No. 1 cylinder is ready for a start of the regular injection. When No. 1 cylinder is ready for a start of the regular injection, the routine goes to step 311, and the regular fuel injection is carried out.

After the first dummy drive and the second dummy drive for No. 1 cylinder are completed, and the regular injection for No. 1 cylinder is completed, the first dummy drive and the second dummy drive for No. 3 cylinder are carried out, and the regular injection for No. 3 cylinder is then carried out; the first dummy drive and the second dummy drive for No. 4 cylinder are carried out, and the regular injection for No. 4 cylinder is carried out; and the first dummy drive and the second dummy drive for No. 2 cylinder are carried out, and the regular injection for No. 2 cylinder is carried out. When the dummy drive is completed twice for each cylinder, the count value of the counter C becomes equal to zero. Consequently, thereafter, the routine goes from step 300 to step 310, and thus only the regular injection is carried out.

Figure 17:
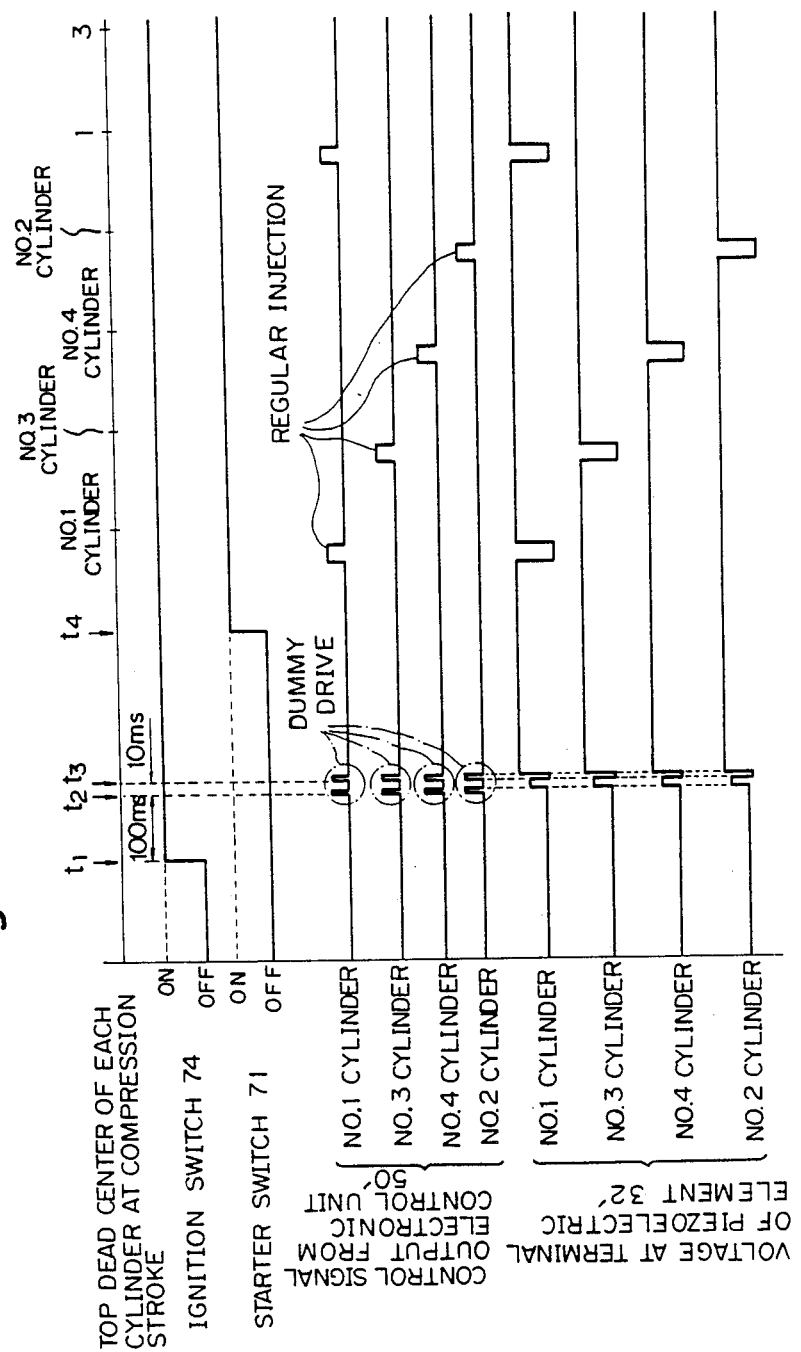
FIG. 17 is a time chart of a further embodiment of the drive control of the piezoelectric element.

FIG. 17 illustrates an alternative embodiment of the drive control method for the piezoelectric element 32'.

In this embodiment, as shown in FIG. 17, the first dummy drive of the piezoelectric elements 32' of all the cylinders is carried out at $t_2$ in FIG. 17, when 100 msec has elapsed after the ignition switch 74 is made ON at $t_1$ in FIG. 17. Then, the second dummy drive of the piezoelectric elements 32' of all the cylinders is carried out at $t_3$ in FIG. 17 when 10 msec has elapsed after the first dummy drive is started at $t_2$ in FIG. 17. Then, at $t_4$ in FIG. 17, the starter switch 71 is made ON, and the engine is started. Thereafter, the regular injection for each cylinder is begun. Also in this embodiment, the predetermined amount of fuel can be injected from the start of the initial regular injection, and thus it is possible to obtain an easy start of the engine.

In this embodiment, since the dummy drive is carried out before the engine is started, the pressure of fuel is the pressurized fuel accumulating chamber 122 (FIGS. 19 and 20) is low when the dummy drive is carried out. Consequently, when the dummy drive is carried out, the fuel injection is not carried out.

Figure 18:
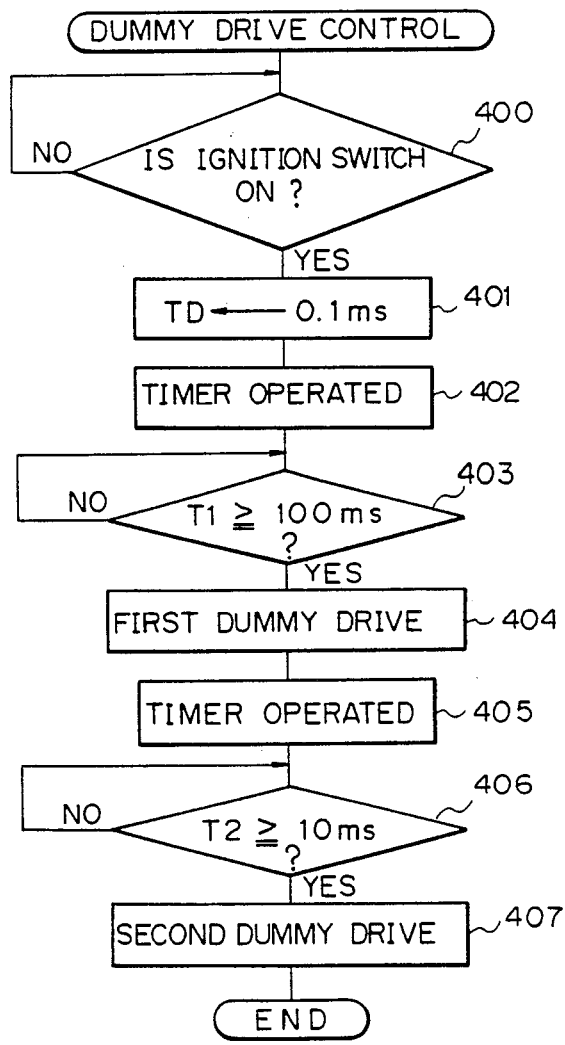
FIG. 18 is a flow chart for executing the drive control illustrated in FIG. 17.

FIG. 18 illustrates a routine for carrying out the dummy drive shown in FIG. 17. This routine is executed only when the engine is started.

Referring to FIG. 18, in step 400, it is determined whether or not the ignition switch 74 is made ON. When the ignition switch 74 is made ON, the routine goes to step 401, and 0.1 msec is memorized as the time TD of the first dummy drive. Then, in step 402, a timer is operated, and in step 403, it is determined whether or not the count value T1 of the timer exceeds 100 msec. If $T1 \geq 100$ msec, the routine goes to step 404, and the first dummy drive of the piezoelectric element 32' of all the cylinders is carried out. Then, in step 405, another timer is operated, and in step 406, it is determined whether or not the count value T2 of the other counter exceeds 10 msec. If $T2 \geq 10$ msec, the routine goes to step 407, and the second dummy drive of the piezoelectric element 32' of all the cylinders is carried out.

When the starter switch 71, is made ON, the regular injection is begun on the basis of another routine (not shown).

In this embodiment, the electronic control unit 50' produces only two dummy pulses for each cylinder, but it is understood that the electronic control unit 50' can produce three or more dummy pulses for each cylinder.

According to the present invention, the piezoelectric element is driven prior to the regular injection, and as a result, since the piezoelectric element can be charged with a sufficient amount of electrons when the regular injection is to be carried out, the regular injection is carried out only when needed, and therefore, it is possible to obtain an easy start of the engine.

While the invention has been described by reference to specific embodiments chosen for purposes of illustration, it should be apparent that numerous modifications could be made thereto by those skilled in the art without departing from the basic concept and scope of the invention.

We claim:

1. A fuel injection control device of an engine having a source of electric power, an ignition switch, a crankshaft, at least one cylinder, and at least one fuel injector, the fuel injection control device comprising:

a piezoelectric element for controlling an injection of fuel from said fuel injector;

drive means having at least one LC resonant circuit for selectively charging said piezoelectric element with electrons and discharging electrons charged in said piezoelectric element to drive said piezoelectric element;

regular injection control means actuated in response to engine operating parameters to control said drive means for driving said piezoelectric element to carry out a regular injection of at least one pulse of a predetermined amount of fuel by said fuel injector, and dummy drive control means actuated to control said drive means for performing a number, equal to at least one, of cycles of charging and discharging of said piezoelectric element to increase the charge difference between the charged and discharged states of the piezoelectric element without causing an injection of a predetermined amount of fuel, prior to an actuation of the regular injection control means, sufficient to assure a charge state in said piezoelectric element at the time of actuation of the regular injection control means that will enable the regular injection control means to carry out said regular injection of at least one pulse of a predetermined amount of fuel.

2. A fuel injection control device according to claim 1, wherein each of said at least one LC resonant circuit comprises a coil and said piezoelectric element.

3. A fuel injection control device according to claim 1, wherein said dummy drive control means begins to actuate the drive means to perform charging and discharging of said piezoelectric element immediately after the ignition switch is made ON.

4. A fuel injection control device according to claim 3, wherein said dummy drive control means repeatedly actuates the drive means to perform alternate charging and discharging of said piezoelectric element until the engine is started.

5. A fuel injection control device according to claim 4, wherein said dummy drive control means repeatedly actuates the drive means to perform a charging and discharging cycle having a predetermined period until the starter switch is made ON, and said dummy drive control means repeatedly actuates the drive means to perform a charging and discharging cycle having a period determined by a predetermined angular movement of the crankshaft of the engine after said starter switch is made ON.

6. A fuel injection control device according to claim 5, wherein said predetermined period of each cycle of charging and discharging before the starter switch is made ON is shorter than a period at which said regular injection is carried out.

7. A fuel injection control device according to claim 5, wherein said predetermined period of each cycle of charging and discharging before the starter switch is made ON becomes longer as a temperature of the engine becomes higher.

8. A fuel injection control device according to claim 7, wherein both a period of said charged state and a period of said discharged state of each cycle of charging and discharging before the starter switch is made ON become longer as the temperature of the engine becomes higher.

9. A fuel injection control device according to claim 5, wherein said predetermined angular movement of the crankshaft is smaller than an angular movement of the crankshaft through which said regular injection is carried out.

10. A fuel injection control device according to claim 5, wherein said predetermined angular movement of the crankshaft becomes larger as a temperature of the engine becomes higher.

11. A fuel injection control device according to claim 10, wherein said regular injection is carried out when said piezoelectric element is in the charged state and, before the engine is started, the angular movement of the crankshaft through which said piezoelectric element is in the discharged state becomes larger as the temperature of the engine becomes higher.

12. A fuel injection control device according to claim 11, wherein the angular movement of the crankshaft through which said piezoelectric element is in the charged state is determined so as to inject an amount of fuel necessary to start the engine.

13. A fuel injection control device according to claim 11, wherein the angular movement of the crankshaft through which said piezoelectric element is in the charged state becomes smaller as the temperature of the engine becomes higher.

14. A fuel injection control device according to claim 5, wherein said fuel injector is a unit injector having a plunger which is driven by the engine and pressurizes fuel, and, after said starter switch is made ON, said regular injection control means initially actuates the drive means at a crankangle such that said piezoelectric element is driven when said plunger is pressurizing the fuel.

15. A fuel injection control device according to claim 4, wherein said dummy drive control means repeatedly actuates the drive means no more than a predetermined number of times.

16. A fuel injection control device according to claim 15, wherein said predetermined number becomes smaller as a temperature of the engine becomes higher.

17. A fuel injection control device according to claim 1, wherein said dummy drive control means begins to actuate the drive means to perform charging and discharging of said piezoelectric element after a starter switch is made ON and before said regular injection is begun.

18. A fuel injection control device according to claim 17, wherein said dummy drive control means begins to actuate the drive means to perform charging and discharging cycles of said piezoelectric element at a compression stroke of the engine, and said regular injection is begun at said compression stroke.

19. A fuel injection control device according to claim 17, wherein said dummy drive control means begins to actuate the drive means to perform charging and discharging cycles of said piezoelectric element at an intake stroke of the engine, and said regular injection is begun at said intake stroke.

20. A fuel injection control device according to claim 17, wherein said fuel injector is an injector in which said regular injection of fuel is carried out when electrons charged in said piezoelectric element are discharged, and the electrons charged in said piezoelectric element are initially discharged when said dummy drive control means begins to actuate the drive means to perform charging and discharging cycles of said piezoelectric element.

21. A fuel injection control device according to claim 17, wherein said regular injection is carried out when said piezoelectric element is in a discharged state, and a period during which said piezoelectric element is in a discharged state before said regular injection is started is shorter than a period of said regular injection.

22. A fuel injection control device according to claim 17, further comprising a fuel pump driven by the engine and feeding fuel at a high pressure to said fuel injector.

23. A fuel injection control device according to claim 1, wherein said dummy drive control means begins to actuate the drive means to perform charging and discharging cycles of said piezoelectric element after an ignition switch is made ON and before a starter switch is made ON.

24. A fuel injection control device according to claim 23, further comprising a fuel pump driven by the engine and feeding fuel at a high pressure to said fuel injector.

25. A fuel injection control device according to claim 23, wherein said at least one cylinder comprises a plurality of cylinders and a piezoelectric element is provided for each cylinder of the engine, and said dummy drive control means begins to actuate the drive means to perform charging and discharging cycles of all of said piezoelectric elements at the same time after said ignition switch is made ON and before said starter switch is made ON.

26. A fuel injection control device according to claim 23, wherein said regular injection is carried out when said piezoelectric element is in a discharged state, and a period during which said piezoelectric element is in a discharged state before said regular injection is started is shorter than a period of said regular injection.

* * * * *

UNITED STATES PATENT AND TRADEMARK OFFICE
CERTIFICATE OF CORRECTION

PATENT NO. : 4,966,119

DATED : 30 October 1990

INVENTOR(S) : Masaki Mitsuyasu et al.

It is certified that error appears in the above-identified patent and that said Letters Patent is hereby corrected as shown below:

At col. 2, line 7, replace "FIG. 8; FIG. 12" with --FIG. 8; FIG. 12--.

At col. 3, line 48, replace "the" (1st occurence) with --and--.

At col. 6, line 62, replace "t" before "begin" with --to--.

At col. 6, line 66, between "32" and "charged" insert --is--.

At col. 7, line 21, replace "$\Delta t2$" with --$\Delta t_2$--.

At col. 7, line 35, replace "period $\Theta_1$" with --crankangle ($\Theta_1 + \Theta_2$)--.

At col. 7, line 68, replace "large" with --larger--.

UNITED STATES PATENT AND TRADEMARK OFFICE
CERTIFICATE OF CORRECTION

PATENT NO.  : 4,966,119

DATED       : October 30, 1990

INVENTOR(S) : Masaki Mitsuyasu et al.

It is certified that error appears in the above-identified patent and that said Letters Patent is hereby corrected as shown below:

At col. 8, line 33, replace "7(e). In step" with --7(e). In step--.

At col. 8, line 40, replace "elapsed" with --elapsed.--.

At col. 8, line 61, insert --$\Delta$-- before "$\Theta_2$".

At col. 8, lines 64 and 65, replace "$\Delta_0$" with --$\Theta_0$--

At col. 9, line 34, replace "ca" with --can--.

At col. 13, line 14, replace "50" with --50'--.

At col. 13, line 66, replace "is" (2nd occurence) with --in--.

Signed and Sealed this

Second Day of June, 1992

*Attest:*

DOUGLAS B. COMER

*Attesting Officer*       *Acting Commissioner of Patents and Trademarks*